United States Patent [19]

Wiedenbeck et al.

[11] 4,254,972
[45] Mar. 10, 1981

[54] STAINLESS STEEL ROTARY JOINT

[75] Inventors: Roger D. Wiedenbeck; Kenneth W. Boughton; Richard Maurer, all of Three Rivers, Mich.

[73] Assignee: The Johnson Corporation, Three Rivers, Mich.

[21] Appl. No.: 820

[22] Filed: Jan. 4, 1979

[51] Int. Cl.³ .............................................. F16L 27/06
[52] U.S. Cl. ...................... 285/61; 285/134; 285/279; 285/286; 285/422
[58] Field of Search ............... 285/134, 61, 136, 267, 285/268, 269, 270, 271, 279, 281, 286, 422

[56] References Cited

U.S. PATENT DOCUMENTS

| | | | |
|---|---|---|---|
| 1,529,994 | 3/1925 | Ellis | 285/279 |
| 2,305,725 | 12/1942 | Meyer | 285/281 |
| 2,477,762 | 8/1949 | Monroe | 285/266 |
| 2,497,183 | 2/1950 | Monroe | 285/266 |
| 2,733,080 | 1/1956 | Gill | 285/281 X |
| 2,791,449 | 5/1957 | Monroe | 285/134 |
| 2,805,086 | 9/1957 | Shumaker | 285/279 |
| 2,836,439 | 5/1958 | Moore | 285/279 X |
| 3,265,411 | 8/1966 | Monroe et al. | 285/135 |
| 3,484,853 | 12/1969 | Nishi | 285/279 X |
| 3,892,256 | 7/1975 | Schlesch | 137/185 |

Primary Examiner—Dave W. Arola
Attorney, Agent, or Firm—Beaman & Beaman

[57] ABSTRACT

The invention pertains to a rotary joint for transmitting fluids to or from rotating members characterized by its corrosion resistance, lightweight and tamperproof construction. The joint includes a sheet metal stainless steel casing in which a tubular nipple is rotatably mounted upon graphite guide bearings. A nipple seal defined on the nipple engages an annular seal ring interposed between the nipple seal and a guide, and a compression spring biases the nipple and nipple seal in a direction to maintain a sealing engagement between the seal surfaces. A threaded adapter located at an end of the casing permits fluid conducting conduits to communicate with the nipple.

8 Claims, 5 Drawing Figures

STAINLESS STEEL ROTARY JOINT

SUMMARY OF THE INVENTION

The invention pertains to rotary joints for transmitting fluids between stationary conduits and rotating members.

Rotary joints capable of conducting fluids under superatmospheric or subatmospheric pressures have long been used to interconnect stationary conduits with rotary members, such as drying or cooling drums. Such rotary joints are widely used in the paper making and web processing arts, and typical rotary joint constructions are shown in the assignee's U.S. Pat. Nos. 2,477,762; 2,497,183 and 3,265,411. Such rotary joints normally consist of a cast body or casing having a nipple coaxially rotatably mounted within the body wherein an exterior end of the nipple is mounted upon the rotating drum, and the nipple end within body is provided with means for establishing a rotatable fluid tight relationship with the body. Various types of seal and bearing arrangements are utilized, and it is common to include syphon pipe structure within the nipple wherein, in a steam heat installation, steam may introduce into the drum, and the condensate removed therefrom, through a single rotary joint.

Conventional rotary joints of the above described type are usually assembled by the use of bolts, and heads and wear plates are removably affixed to the body. This assembly permits replacement of the joint bearings and seals, and while such seal replacement permits regular maintenance, it has been the practice of rotary joint owners to occasionally replace worn original seals with seals of lesser quality than originally provided subjecting the original rotary joint manufacturer to undeserved liability.

Known rotary joints often use asbestos gasket materials, and such use of asbestos subjects the manufacturer to further product liability under the requirements of the Toxic Substance Control Act.

The general use of cast iron and steel with conventional rotary joints results in significant weight, and such weight has an adverse affect upon seal life. Also, in some industrial environments the rotary joint is subjected to highly corrosive liquids, mist and gases, and the cast body is subject to rapid corrosion, especially under the elevated temperatures achieved when the joint is conducting steam or hot water.

While stainless steel has long been recognized for its noncorrosive characteristics, and as cast stainless steel has been used by the assignee in the construction of its rotary joints, to the inventors' knowledge a rotary joint has not herefore been constructed of sheet metal stainless wherein the lightweight advantages of such a construction have been fully utilized. Stainless steel sheet metal casings have been employed in the construction of steam traps, as shown in U.S. Pat. No. 3,892,256, but such steam traps do not incorporate rotative bearing and seal structure, and are not subjected to the stresses and wear imposed upon a rotary joint.

It is an object of the invention to provide a rotary joint employing a light weight sheet metal casing of noncorrosive material which is of a tamper-proof construction and wherein extended seal life is achieved.

A further object of the invention is to provide a lightweight rotary joint of relatively inexpensive construction wherein an extended operable life is achieved and which economically permits complete replacement of the entire joint after the effective seal life has been depleted.

An additional object of the invention is to provide a lightweight rotary joint utilizing seals capable of efficient operation under elevated temperatures wherein effective engagement between the seals is maintained during wearing of the seals, and indicia indicate seal depletion and the necessity of rotary joint replacement.

The rotary joint of the invention utilizes a sheet metal casing or body formed of stainless steel, and one end of the body is provided with an opening through which a tubular nipple extends for attachment to the rotary member to be serviced by the joint. The opposite casing end is provided with a threaded adapter to which a fluid conduit, of conduits, may be attached. Internally, the nipple is supported on a pair of annular graphite guides, a guide being disposed adjacent each casing end and sealed thereto by an O-ring. An annular nipple seal defined on the nipple, and fixed thereto, engages a graphite seal ring and a compression spring engaging the nipple seal biases the nipple in a direction to maintain a sealing engagement between the nipple seal, seal ring and the adjacent guide.

The casing is of a substantially cylindrical construction, and a stop rod lug may be welded thereto for receiving a stop rod which partially supports the casing and prevents axial or rotational movement thereof. The conduit adapter threaded to the casing adapter may include a syphon pipe port, for accommodating either a stationary or rotating syphon.

The ends of the casing are defined by the same sheet metal assembly forming the sidewall, and the preferred method of construction comprises forming the casing from the two cup-like components by drawing, and welding the cups' open ends in an abutting relationship to define the hollow casing configuration. The rotary joint is assembled prior to the casing being welded, and the assembly process, and construction, renders the rotary joint tamper-proof.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
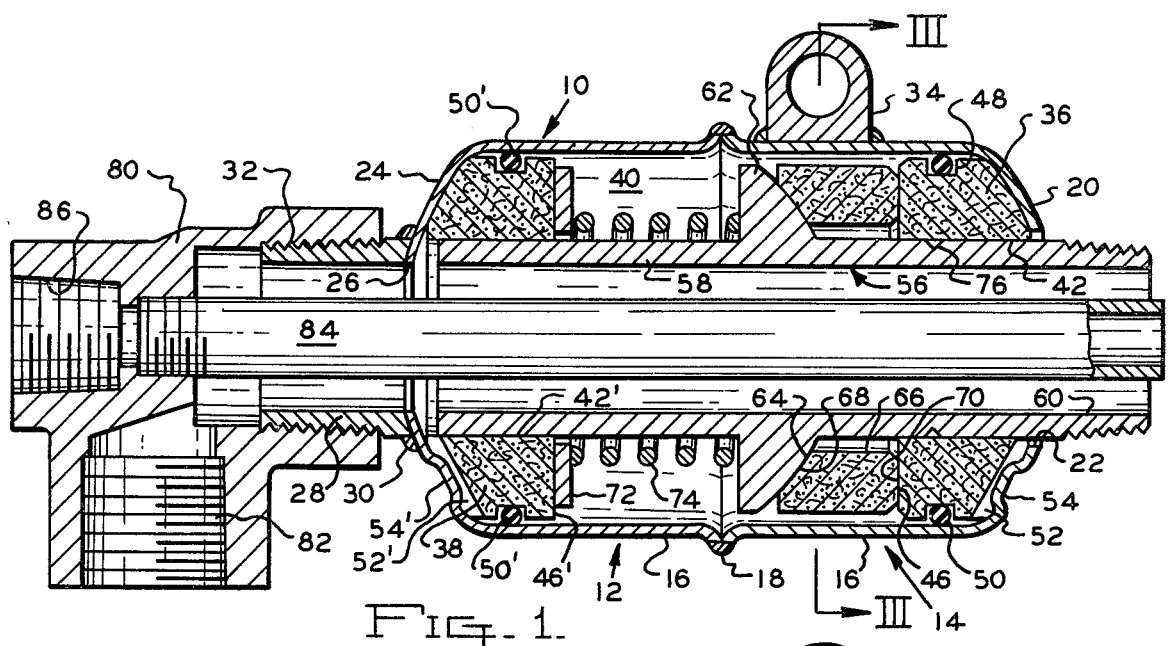
FIG. 1 is an elevational, diametrical, sectional view of a rotary joint constructed in accord with the invention.
Figure 2:
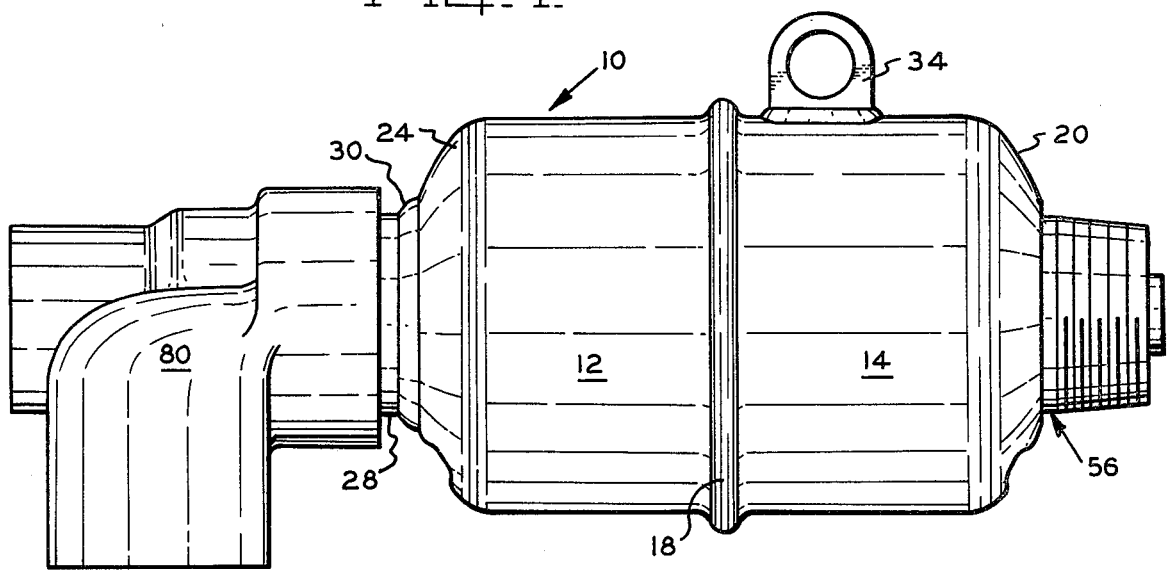
FIG. 2 is an elevational view of the rotary joint of FIG. 1.

The rotary joint of the invention includes a casing 10 of an elongated generally cylindrical configuration which is formed of a pair of substantially identical sheet metal cup portions 12 and 14, which are usually formed by a metal drawing process. The cup portions each include a cylindrical sidewall 16 terminating in an outwardly deformed edge which are abutted and welded at bead 18. The end wall 20 is provided with a central opening 22, and the end wall 24 is formed with a coaxial opening 26, an an exteriorly threaded tubular adapter 28 is coaxially affixed to the end wall 24 by weld bead 30. The threads 32 are conventional pipe threads.

Preferably, the casing 10 is formed of an austenitic stainless steel, such as AISI No. 304L, and such metal is highly resistant to corrosion.

A stop rod lug 34 may be welded to the casing sidewall, and the lug includes an opening for receiving the threaded end of a stop rod, not shown, which is fixed to stationary structure and provides a support for the rotary joint and prevents axial movement and rotation thereof.

A pair of annular guides 36 and 38 are located within the casing chamber 40. Guide 36 is disposed adjacent the casing end 20 and includes a cylindrical bore 42, a flat radial seal surface 46, and an annular groove 48 receiving O-ring 50 which sealingly engages the sidewall 16. Guide 36 is radially grooved at 52 and an indentation 54 defined in end wall 20 is received within groove 52 which functions as a key to prevent rotation of guide 36 within the casing. Guide 38 adjacent casing end wall 24 is of an identical construction, including cylindrical bore 42', and radial surface 46', and is sealed to the casing by O-ring 50'. Likewise, groove 52' and indentation 54' lock the guide 38 against rotation.

A tubular nipple 56 includes a inner end 58 located within the casing chamber 40 and an outer end 60 which extends through the casing opening 22. Outer end 60 is formed with pipe threads, or other attachment means, well known in the art, whereby the nipple may be coaxially affixed to a rotating dryer drum or the like, not shown, wherein the nipple communicates with the drum interior and rotates with the drum.

An annular nipple seal 62 is defined upon the nipple inner end 58 and the nipple seal includes a spherical convex sealing surface 64 having a center lying upon the nipple axis. The nipple diameter is such as to be closely received within the bores of the guides 36 and 38 and the nipple is rotatably supported within the casing 10 by the guides.

An annular seal ring 66 is interposed between the nipple seal 62 and guide 36, and the seal ring includes a spherical concave sealing surface 68 engaging nipple seal surface 64 in a complementary manner, and the flat radial seal ring surface 70 sealingly engages guide surface 46.

An annular thrust plate 72 engaging guide surface 46' engages one end of compression spring 74 while the other spring end bears against nipple seal 62 to bias the nipple toward the right, FIG. 1. This biasing force will maintain an effective sealing between surfaces 64 and 68, and 70 and 46.

Preferably, the guides 36 and 38, and the annular seal ring 66, are formed of a long wearing nonasbestos material such as graphite, and the seal ring will provide a long effective seal life as it gradually wears. An annular indicia groove 76 is defined upon the exterior surface of the nipple 56, and when the seal ring 66 is significantly worn its axial dimension will be substantially reduced with respect to that shown in FIG. 1 and the groove 76 will become visible adjacent opening 22, and maintenance personnel will appreciate that the rotary joint should be replaced.

Figure 4:
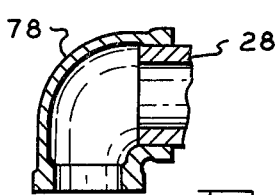
FIG. 4 is a partial, elevational, sectional, reduced scale view of a through flow fluid connector.

Rotary joints, as used with rotating heat exchanging drums, are basically of three types. The through flow type permits a single fluid to be handled by the joint, and in such instance a fitting 78 such as shown in FIG. 4 is mounted upon the threaded adapter 28 whereby a conduit may be attached to the adapter in communication with the interior of the nipple. If the rotary joint is to be used with a steam heated dryer drum and a stationary condensate syphon is employed, the fitting 80 shown in FIG. 1 is utilized. Fitting 80 threads upon adapter 28 and includes the steam inlet port 82 affixed to a steam supply conduit, not shown, and the staionary syphon pipe 84 extends through the nipple and may be threaded into the fitting in communication with the syphon discharge port 86.

Figure 5:
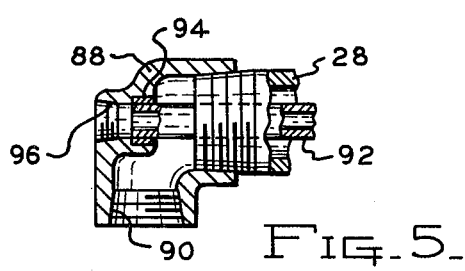
FIG. 5 is a detailed, sectional, reduced scale view of a rotary syphon adapter as used with the rotary joint of the invention.
Figure 3:
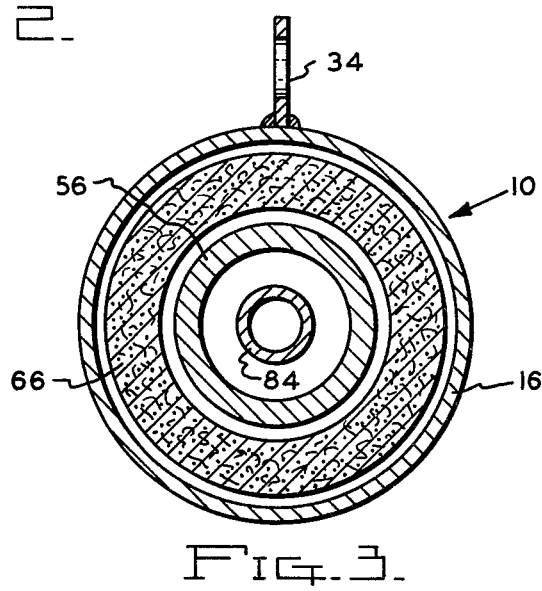
FIG. 3 is an elevational, sectional view as taken along Section III—III of FIG. 1.

In the third rotary joint installation as shown in FIG. 5, a rotary syphon fitting 88 includes the steam inlet port 90 and the rotating syphon conduit 92 is rotatably supported on the fitting 88 by seal 94, whereby the end of the syphon pipe communicates with the syphon discharge port 96.

Accordingly, it will be appreciated that the casing adapter 28 permits a variety of plumbing fittings to be readily attached to the rotary joint, and it will be appreciated that the adapter may either be externally or internally threaded, or could constitute a bolt-on flange, or other conventional fluid coupling construction.

The sheet metal construction of the rotary joint substantially reduces the weight of the joint as compared with cast casings for joints of equivalent capacity. Also, the sheet metal construction is aesthetically "clean". The carbon-to-carbon seal assembly provided with the graphite guides and seal ring assures a long effective seal life, and as the casing assembly is achieved by weld bead 30 the joint is tamper-proof and modification by unauthorized personnel is prevented.

The resultant reduction in weight significantly adds to the bearing life, and as the nipple is axially supported by the guides 36 and 38 at spaced locations and for significant axial lengths lateral forces on the nipple are effectively distributed.

It is appreciated that various modifications to the invention may be apparent to those skilled in the art without departing from the spirit and scope of the invention.

We claim:

1. A rotary joint characterized by its light weight, long life and tamper-proof construction, comprising in combination, an elongated sheet metal casing having an axis, a side wall and first and second ends defining a chamber, said casing being formed of sheet metal portions welded together and said ends being integrally formed of the sheet metal material of said side wall and extending from said side wall toward said axis, an elongated tubular nipple having an outer end extending from said casing first end and an inner end within said chamber and coaxial with said casing, attachment means defined on said nipple outer end, adapter attachment means defined on said casing second end in communication with said nipple, an annular nipple seal sealingly fixed on said nipple inner end having a sealing surface facing said casing first end, an annular first guide within said chamber adjacent said first end, sealing means defined on said first guide sealing said guide to said casing, an annular seal ring located intermediate said nipple seal and said guide sealingly engaging said nipple seal and guide, an annular second guide within said chamber adjacent said second end, sealing means defined on said second guide sealing said second guide to said casing, said guides including central cylindrical bores rotatably supporting said nipple inner end and maintained in assembly upon said nipple by said casing ends, and a compression spring circumscribing said nipple inner end located between said second guide and nipple seal biasing said nipple seal toward said seal ring and first guide to maintain sealing engagement of said seal ring with said nipple seal and said first guide.

2. In a rotary joint as in claim 1 wherein said casing is formed of stainless steel.

3. In a rotary joint as in claim 1, a stop rod support lug affixed to said casing radially extending therefrom, and a stop rod receiving opening defined in said lug.

4. In a rotary joint as in claim 1, wherein said adapter attachment comprises a tubular member coaxially welded to said casing second end, and pipe threads defined on said member.

5. In a rotary joint as in claim 1 wherein said seal ring is formed of a non-metallic wear resistant material.

6. In a rotary joint as in claim 5 wherein said seal ring and first and second guides are formed of graphite.

7. In a rotary joint as in claim 1, said nipple seal sealing surface constituting a convex spherical segment having a center lying on said casing axis, and a complementary concave spherical surface defined on said seal ring engaging said sealing surface.

8. A rotary joint characterized by its light weight, long life, resistance to corrosion and tamper-proof construction comprising, in combination, a stainless steel sheet metal casing having an axis, a cylindrical side wall, and first and second ends integral with said wall and extending from said side wall toward said axis defining a chamber, said casing being defined by a pair of cup shaped portions welded together at a circular joint upon said side wall, a tubular nipple coaxially received within said casing having an inner end within said chamber and an outer end extending through said first end, attachment means defined on said nipple outer end, adapter attachment means defined on said casing second end in communication with said nipple, an annular nipple seal sealingly fixed on said nipple end having a convex sealing surface, an annular graphite guide adjacent each casing end maintained within said casing by said casing ends and sealed to said casing and rotatably supporting said nipple, sealing means defined on said guides engaging said casing, an annular seal ring interposed between said nipple seal and the guide adjacent said casing first end, and spring means biasing said nipple seal toward said seal ring and into sealing engagement therewith maintaining a sealed relationship between said nipple seal, seal ring and said guide adjacent said first end.

* * * * *